United States Patent [19]

Davies et al.

[11] 4,428,426
[45] Jan. 31, 1984

[54] METHOD OF PLACING AND CONSOLIDATING A MASS OF PARTICULATE MATERIAL AND COMPOSITION FOR USE IN CARRYING OUT SAID METHOD

[75] Inventors: David R. Davies, Rijswijk, Netherlands; Edwin A. Richardson, Houston, Tex.; Adrianus M. P. M. Hagelaars, Rijswijk, Netherlands

[73] Assignee: Shell Oil Company, Houston, Tex.

[21] Appl. No.: 322,483

[22] Filed: Nov. 18, 1981

[30] Foreign Application Priority Data

May 22, 1981 [GB] United Kingdom ................. 8115811

[51] Int. Cl.³ ............................................ E21B 43/04
[52] U.S. Cl. .................................. 166/276; 166/295; 166/300
[58] Field of Search ........................ 166/276, 295, 300

[56] References Cited

U.S. PATENT DOCUMENTS

| | | | |
|---|---|---|---|
| 2,941,594 | 6/1960 | Ladd et al. | 166/276 |
| 2,986,538 | 5/1961 | Nesbitt et al. | 166/276 X |
| 3,593,798 | 7/1971 | Darley | 166/276 X |
| 3,621,915 | 11/1971 | Bruist et al. | 166/276 |
| 3,878,893 | 4/1975 | Copeland | 166/276 |
| 3,929,191 | 12/1975 | Graham et al. | 166/276 |
| 4,291,766 | 9/1981 | Davies et al. | 166/276 |
| 4,336,842 | 6/1982 | Graham et al. | 166/276 |

Primary Examiner—George A. Suchfield

[57] ABSTRACT

Sand grains coated with a solid non-cured epoxy resin with a softening point above 35° C. are placed in a well for gravel pack, well repair or fracturing purposes. The epoxy resin softens at formation temperature and reacts with a hardener (such as a tertiary amine) diluted in water present in the pore space of the mass of sand grains. A consolidated mass of sand grains is thus obtained. The coated sand grains can be transported to the well site and stored over long periods at relatively high temperatures without risk of quality decrease.

6 Claims, 1 Drawing Figure

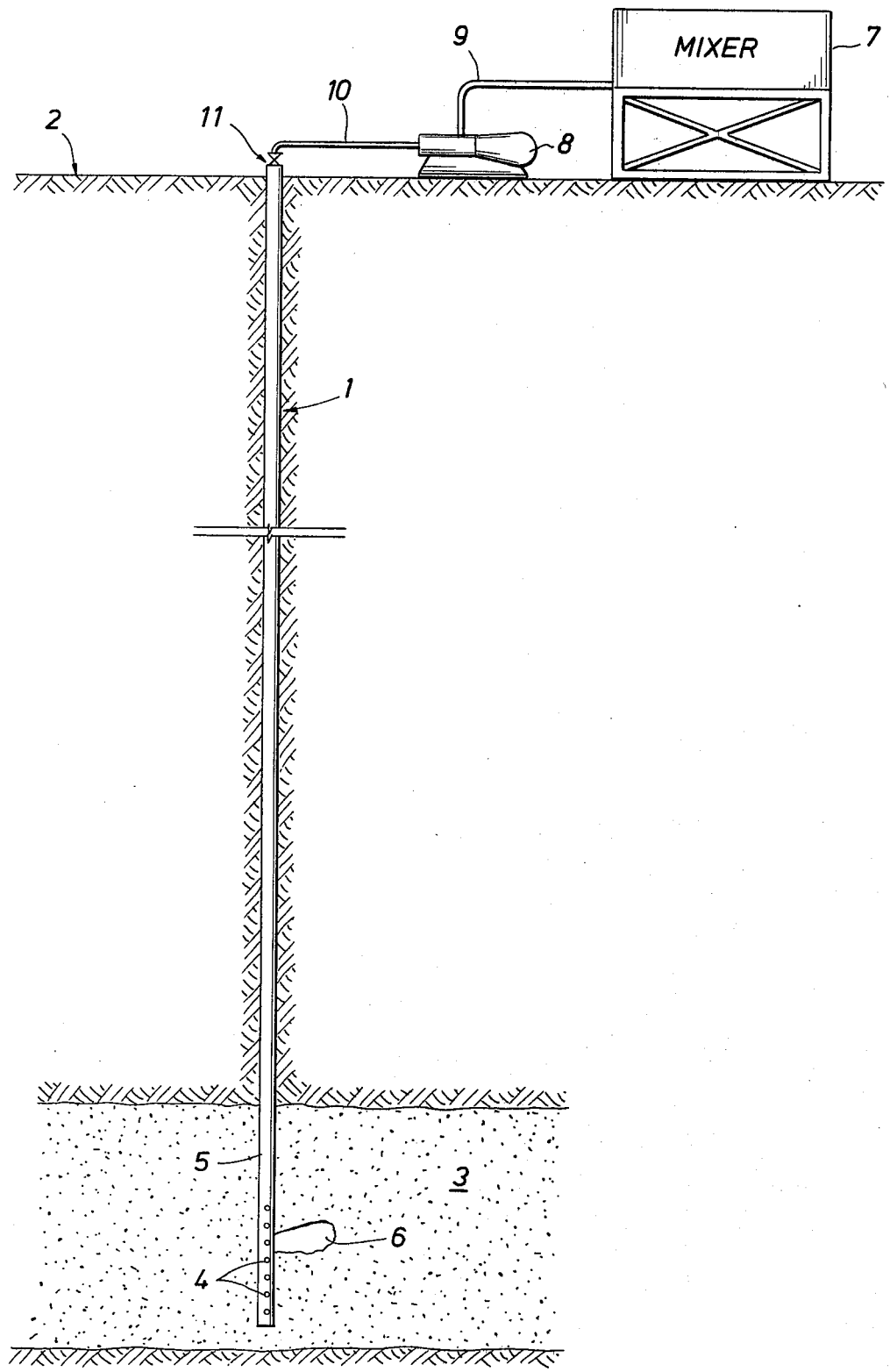

METHOD OF PLACING AND CONSOLIDATING A MASS OF PARTICULATE MATERIAL AND COMPOSITION FOR USE IN CARRYING OUT SAID METHOD

BACKGROUND OF THE INVENTION

The invention relates to a method of placing and consolidating a mass of particulate material in a permeable subsurface formation or reservoir and/or a well penetrating the formation. The invention also relates to a composition for carrying out said method.

The present invention relates to treating a formation (and/or a well penetrating such a formation) having fluid in the pore space thereof. Such fluid may be a hydrocarbon liquid, hydrocarbon gas or other gas, water or other liquid and may have chemical compounds dissolved therein. The reservoir fluid may be valuable and may be recovered, or the method may be carried out in a subsurface formation that is to be used for storing fluids, such as waste liquids.

The presence of a consolidated mass of particulate material in or around a well penetrating a subsurface reservoir formation may be desirable for various reasons, such as for preventing closure of fractures that have been made in the formation, for preventing the influx of formation grains into the well, and for filling up cavities around the well, which cavities have been formed during a preceding fluid recovery period wherein formation grains have been entrained by fluid passing from the formation pore space into the well.

Most frequently, a consolidated mass of particulate material is used to prevent the entrainment of formation particles in fluid flowing from the formation into the well. Particles entrained in such fluid will easily locally erode conduits such as the casing or the production tubing in a well, the flow lines on the surface, and/or choke the flow passage in the well or in the conduits communicating with the well. Costly repairs or well cleaning treatments are then required to bring the well into production.

Various methods are known for placing a particulate material in a well and/or a subsurface formation. Such particles are often transported through the well by means of a carrier fluid, and after a mass of the particles has been in the well or the formation, a consolidation treatment is effected to form a bond between the particles. Resins or resin-forming materials are preferred as a bonding agent, and may be injected in liquid form (for example, by dissolving them in a liquid) into the pore spaces of the mass of particulate material after it has been placed. However, a uniform distribution of the resin over the particles forming the mass to be consolidated is often difficult to achieve by such a procedure. A more uniform coating is obtained by pre-coating the particles with a resinous material and, after emplacing the coated particles, allowing or causing the hardening of the resinous material.

In the prior methods, the resinous bonding agent materials have consisted of viscous liquid layers around the particles and have often contained both a resin-forming material and a curing agent for causing the hardening or curing of the resin. For example, the following U.S. patents have described the following procedures:

U.S. Pat. No. 2,815,815 describes injecting an oil slurry of sand coated with a mixture of resin-forming liquid and curing agent.

U.S. Pat. Nos. 2,941,594 and 3,123,137 describe injecting particles coated with a liquid-stage hardenable or solidifiable epoxy, phenolic, or the like, resin which will become hard on standing or when contacted by a hardener.

U.S. Pat. No. 2,981,334 describes injecting sand coated with a stage B phenolic, epoxy, or the like, resin mixed with metal particles which are subsequently acidized to heat the positive mass of particles.

U.S. Pat. No. 2,986,538 is similar to the 2,981,334 patent, using epoxy resins which are first partially hardened and then quenched.

U.S. Pat. No. 3,335,796 describes injecting particles which are first pre-coated with a cured resin and then re-coated with a liquid resin which is cured after the particles are deposited.

U.S. Pat. Nos. 3,621,915; 3,867,986 and 3,878,893 describe injecting suspensions of particles, epoxy resin-forming materials, and curing agents, in an oil solvent which is only partially miscible with the solvents for the resin-forming components.

U.S. Pat. No. 3,929,191 describes injecting sand coated with alkali-catalyzed phenolic resins which are solid at surface temperatures but soften and then cure at the reservoir temperature.

U.S. Pat. No. 4,127,173 describes injecting sand coated with hardenable resin material around a shaped pipe, hardening the resin, and then removing the shaped pipe.

However, since the epoxy resin-forming materials heretofore used for precoating such particles include a hardener, the storage time of the coated particles is rather restricted, even at relatively low surface temperatures. Moreover, if a mass of such precoated particles becomes stuck or misplaced in the well (such as may happen when failure of the pumps occurs), the resin will soften and the velocity of the reaction between the resin and the hardener will increase. While the reaction velocity may be rather low at surface conditions, when the particles are subjected to the temperature at the depth at which the reaction velocity may be high, a mass of the particles may be consolidated at an undesired location from which the mass either cannot be removed, or can be removed only at great cost.

Further, a prolonged storage period of particles coated with a mixture of epoxy resin and a latent, modified curing agent, such as a polyamide hardener, is often harmful to the quality of the consolidated mass to be formed by this material, in particular when the prolonged storage takes place in areas with tropical or sub-tropical climate.

The object of the present invention is to provide a method of placing and consolidating a mass of particles in a well and/or an adjacent reservoir formation by using particles coated with a further polymerizable solid epoxide having a softening point and reactivity arranged so that the coated particles can be transported and stored over long periods at the surface temperature without causing a deterioration of the coating or the strength of the consolidation which is subsequently provided.

Another object of the invention is to provide an economic, efficient and safe method of placing and consolidating a mass of particulate material in or around a well or borehole in a subsurface formation.

SUMMARY OF THE INVENTION

The present invention relates to installing a resinconsolidated mass of particles within a selected subterranean location. The particles are initially coated with a polyepoxide (i.e., "epoxy compound") which is solid at the surface temperature but is softened at the temperature of the selected subterranean location and, at that temperature, reacts and yields a cured solid resin when contacted with an aqueous liquid containing a substantially uniformly distributed polyamino compound which is a curing or hardening agent for epoxy resin-forming components. The polymer-coated particles are suspended within an aqueous liquid and the suspension is pumped into the well so that a mass of particles is deposited in the selected subterranean location. The particles in the mass are contacted with an aqueous liquid which contains a substantially uniform distribution of said polyamino compound so that the mass is consolidated by the hardening of the coatings to a cured solid epoxy resin.

BRIEF DESCRIPTION OF THE DRAWING

The drawing is a schematic illustration of a well and reservoir situation to which the invention is applicable.

DESCRIPTION OF THE INVENTION

The curing agent or hardener used in the present invention can comprise substantially any water-dispersible polyamino compound which is a curing or hardening agent for epoxy resin-forming compounds and has physical and chemical properties adapting it to be dissolved and/or substantially uniformly dispersed within an aqueous liquid which is chemically inert with respect to the resin-formation. The hardener is preferably a tertiary amine, such as triethanolamine, 2-(dimethylaminomethyl)phenol (trademark "DMP-10"), and 2,4,6-tris(dimethylaminomethyl)phenol (trademark "DMP-30"). The curing agent is dissolved or substantially uniformly distributed in an aqueous liquid in an amount suitable for hardening the epoxy compound, such as in an amount between 0.1 and 3.5%w. Good results will be obtained in the range between 0.5 and 2.0w%.

Substantially any solid, further polymerizable polyepoxide, of appropriate softening point and reactivity, can be used in this invention. The expression "epoxy compound" as used in this specification means a polyepoxide which is solid at the surface temperature of the well site, is softened at the temperature of the subsurface zone to be treated, has an average of more than one epoxy group per molecule, and is capable of being cured to a hardened epoxy resin. Such polyepoxides, or epoxy compounds may be saturated or unsaturated, aliphatic, aromatic or heterocyclic and may contain substituents such as halogen atoms, hydroxy groups and ether groups; they may be monomeric or polymeric. The epoxy compound as applied to the particles to be consolidated is free of any hardener or curing agent. Preferred epoxy compounds for use in the method of this invention include those which have a softening point between about 35° C. and 150° C. As known to those skilled in the art, the softening point of the epoxy compound can conveniently be measured by the method of Durrans or the method of Kofler. The amount of epoxy compound applied preferably varies from 1 to 15 parts by weight per 100 parts by weight of the particulate material. The particulate material (such as sand grains) has a size that is suitable for the purpose for which the consolidated particulate material is applied.

Preferred polyepoxides are glycidylethers of polyhydric phenols, for example condensates of aldehydes or ketones with phenol or cresols, such as novolacs. Particularly preferred are glycidyl polyethers of 2,2-bis(4-hydroxyphenyl)-propane having an epoxy equivalent weight of from 400 to 2000. Examples of such glycidyl polyethers are the commercial products "EPIKOTE" 1001 (softening point 50°–70° C., epoxy equivalent weight 450–500), "EPIKOTE" 1002 (softening point 60°–80° C., epoxy equivalent weight 575–700), "EPIKOTE" 1004 (softening point 80°–100° C., epoxy equivalent weight 850–940), and "EPIKOTE" 1007 (softening point 100°–125° C., epoxy equivalent weight 1550–2000). "EPIKOTE" is a registered trade mark. Very good results can be obtained with "EPIKOTE" 1001. "EPIKOTE" 1007 is, in particular, suitable for use in wells on sites in extremely hot climates.

Also suitable for use in the present invention are mixtures of these epoxy compounds or polyepoxides or mixtures of one or more of these epoxy compounds, which are solid with "EPIKOTE" 828 (trademark) or another epoxy resin that is liquid at surface temperature. By varying the amounts of the various liquid epoxy resins in such mixture, the softening point thereof may be adapted within narrow limits to the temperature of the well and/or the formation wherein the discrete particles coated with such mixture are to be applied and the temperature at which the sand grains coated with the resin are to be stored and/or transported. Thus, in one preferred embodiment, determinations are made of the temperatures likely to be encountered in or near the well at both a surface location and within the selected subterranean zone and the softening temperature of the polyepoxide with which the particles coated, prior to being emplaced and consolidated, is adjusted by mixing the polyepoxide with at least one curable liquid resin or mixing at least two solid polyepoxides having different softening temperatures in proportions such that the mixture is solid and substantially nontacky at the surface temperature of said surface location but is softened and reactive at the temperature of the selected subterranean zone.

Any hardener suitable for being water-diluted by being dissolved or dispersed in water and being suitable for hardening or curing a softened polyepoxide when the water-diluted hardener contacts a layer of the polyepoxide on the surface of discrete particles, may be used in the method of the present invention. Such hardeners are preferably tertiary amines. Suitable examples thereof are triethanolamine, DMP-10 and DMP-30. The hardener is present in the diluted form in an aqueous phase, that is dissolved and/or dispersed in this phase.

If properly stored, the discrete particles coated with the present type of epoxy compound (which compound is free from any epoxy resin hardener), will not stick together under the temperature conditions usually prevailing at the surface but the coating material will become soft and sticky at the higher temperature prevailing at the location in the subsurface formation, where the mass of particulate material is placed that is to be consolidated in a later stage. At temperatures above the softening point, the coating layers of epoxy compound on the discrete particles will coalesce at the points of contact, where the coatings on adjacent particles are in contact with each other, thereby forming a non-solid layer covering all the particles of the mass of particulate material, with a liquid-filled permeable porosity comprising interconnected pore spaces being left between the coated particles.

Applicants have discovered that in the absence of hardener in the epoxy compound coating, the epoxy-coated discrete particles can be transported without any problems from the place where the material has been epoxy compound-coated to a well site where it has to be used, even if this well site is in a tropical climate zone (provided that the material is properly stored and not excessively exposed to direct sun rays). Since the coating material is an uncured epoxy compound and does not contain a hardener, the coated particles may be stored over long periods without losing their ability to form a continuous coating when deposited in a subsurface location and contacted by an aqueous liquid containing the hardener. The particles used in the present process can comprise substantially any high strength solid materials such as sand, glass beads, walnut shells, or the like, which can be formed or comminuted and graded to provide particles generally smaller than about 40 mesh. Particularly suitable particles comprise well rounded sand grains of a size tailored to provide a resin-consolidated mass in which the pore spaces are too small to allow the entry of reservoir sand grains. The particles of the particulate material may be coated with epoxy compound in any suitable manner. For example, the epoxy compound may be dissolved in a volatile solvent, and this solution mixed with the particulate material, while allowing the solvent to evaporate. The final product is screened for removing small lumps of discrete particles that might have been formed during the coating process. Such lumps may then be broken down mechanically whereafter the discrete particles are added to the bulk of the coated particulate material.

The bond between the epoxy compound and the particles may be improved by adding an organosilicon compound such as A 1100 (trademark) marketed by Union Carbide Corporation to the epoxy compound that is used for coating the particles. In an alternative manner, the particles may be pretreated by a bond-improving agent prior to coating them with the epoxy compound.

The chemical composition of A 1100 is

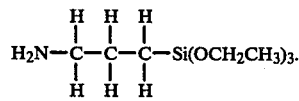

Application of the present invention is not restricted to the use of a bond-improving agent.

Apart from A 1100 mentioned above, Z 6020 (trade mark) marketed by Dow Corning Corporation may be applied for this purpose. The chemical composition of Z 6020 is

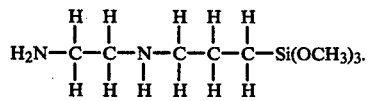

A unique feature of the present ivention is the use of a water-diluted hardener for heat-softened polyepoxide coatings on the particles to be consolidated. The water is used as a carrier agent for displacing the hardener down the well to the location where the mass of epoxy compound coated discrete particles is to be consolidated. Apart from being a transport means for displacing the hardener through the well, the aqueous carrier also acts as a containing agent for bringing the hardener into contact with the polyexpoxide layer that covers the discrete particles—while that polyepoxide has become soft and sticky under the temperature conditions in the subsurface zone to be treated.

The application of the hardener in the water-diluted form in an aqueous phase has many advantages. The use of water for diluting the hardener is cheap as compared to the non-polar carrier agents that are applied in prior art consolidating methods, and furthermore suitable water is readily available in the majority of areas where the present method is suitable for application. Moreover, it is less hazardous than the usual carrier agents and will not harm the environment or the operators on the well site.

A suitable aqueous carrier is water having a limited amount of salt present therein. Brackish water or sea water may be applied provided that the salt contents thereof are lower than say 10%w.

The use of the aqueous carrier requires a hardener, such as a polyamino epoxy resin curing agent, that is dilutable in the aqueous carrier, and is able to cure the resin to the required amount whilst contacting the coating layers only at the outer surface thereof. Among the various hardeners that suit these requirements, triethanolamine may be in particular mentioned, since it is able to harden the coating layer to an extent that is sufficient to withstand the loads to which the consolidated mass will be subjected in the majority of wells and/or in the majority of formations requiring treatments involving the consolidation of discrete particles therein.

In one embodiment of the invention, the coated particles of the particulate material are propelled down the well to the desired location by a first volume of an aqueous carrier, whereas the hardener is subsequently carried by means of a second volume of an aqueous carrier down the well to the desired location where the particulate material has arrived earlier. By pumping these volumes down the well one after the other, there is no chance of a premature consolidation of the particulate material at an undesired location of the well if the pumps that are used for displacing the volumes through the well should break down during the pumping-down period.

In another embodiment of the invention, a single volume of an aqueous carrier is used for transporting the coated particles of the particulate material down the well simultaneously with the hardener. When the coated particles have arrived at the desired location, the pumping action is stopped and the hardener that is dissolved in the carrier liquid stays in the pore space of the mass of particulate material until hardening of the epoxy compound has taken place.

In the drawing, a well 1 is shown extending from the surface 2 to a subsurface permeable formation 3 from which hydrocarbon fluid such as oil is being recovered. The well is completed in a manner known per se, and perforations 4 are present in the lower end of the casing 5 of the well, which perforations form a communication between the interior of the well 1 and the pore space of the formation 3. The production of the oil from the formation 3 via the well 1 has loosened formation grains that were originaly situated close to some of the perforations, as a result whereof a cavity 6 has been formed.

This cavity is to be filled up with a mass of particulate material that should be bonded together to form a permeable mass with a compressive strength sufficient to withstand the load exerted thereon by the fluid flow and by the formation, and a permeability sufficient to allow an economic production of fluid.

A volume of sand grains coated with a layer of epoxy compound is transported to the well site and stored there until the oil recovery process is halted and the well has been made ready for carrying out the method according to the invention.

The grains are coated with a layer consisting of "EPI-KOTE" 1001, which is an epoxy compound which softens in the temperature range of 50°–70° C. The coated particulate material has been manufactured in one of the manners known per se, and has been transported to the site in bags. Since the temperature during transport of the bags to the well site, as well as during storage of the bags at the site is below 40° C., the discrete coated particles of the particulate material will not stick together.

The contents of the bags are mixed in the mixer 7 with an amount of water to which a thickening agent has been added. Triethanolamine that has been found suitable as a hardener for the epoxy resin under the existing formation conditions is added to the water that has been pre-mixed with the coated particles and the thickening agent. The pump 8 is then activated and the resulting mixture is subsequently propelled through the conduit 9, the pump 8, the conduit 10, the well head 11, and the well 1 to the cavity 6. The action of pump 9 is then stopped and the sand grains form a mass of unconsolidated particulate material at the location of the cavity 6. The sand grains stick together as a result of the softening of the epoxy compound being exposed to the formation temperature of 85° C. The triethanolamine that is dissolved in the carrier liquid filling the interstices between the sand grains reacts with the soft layer of epoxy compound that extends over the grains of the pack. On hardening of the epoxy compound, the layer becomes solid, thereby bonding the grains together and forming a consolidated mass of particulate material in the cavity 6.

After hardening of the epoxy compound, the pump 8 is removed, and the conduit 10 is connected to a storage vessel adapted for storing oil. The well is then put to production, and the oil will flow out of the pore space of the formation 3 into the well 1 and subsequently to the surface. Part of this oil passes through the consolidated sand grain pack occupying the space in the cavity 6, without, however, entraining sand therewith.

Reaction rate controllers may be used to control the reaction between the epoxy compound and the hardener. They may suitably be added to the carrier liquid containing the particulate material, and/or to the carrier liquid comprising the curing agent. Preferably, they are dissolved in the liquid wherein the curing agents have also been dissolved. Examples of reaction rate retarders are ketones such as acetone. Examples of reaction rate accelerators are 2-(dimethylaminomethyl)-phenol and salicyclic acid.

Viscosifying agents may be added to the liquid carrying the particulate material. Examples of suitable agents are hydroxyl ethyl cellulose, starch, guar gum, bipolymers, and crosslinked gels.

Coloring agents may, if desired, be added to the epoxy compound for easy identification of various types of epoxy compound used for coating the particulate materials.

Further, flow control agents for epoxy resin-forming materials such as MOD-EPOX (trademark), may be added to the epoxy compound for improving the coalescence of the molten epoxy compound layers on adjoining discrete particles when present in the formation to be treated.

Softening agents for softening the epoxy compound such as acetone, methanol and methylethylketone for lowering the softening temperature of the resin may be added to the aqueous phase.

When transporting the particulate material and the hardener down the well by means of two separate volumes of carrier liquid(s), the even distribution of the liquid containing the curing agent over the pore space of the mass of particulate material can be improved by adding a viscosifying agent to the liquid containing the hardener. Polymers and copolymers have been found to be useful in this respect, provided that concentrations are used at which gelling of the liquid does not occur.

Without restricting the invention, it is observed that—depending on the amount of viscosifying agent applied in the aqueous carrier liquid—amounts up to 100 kg particulate material may be transported down the well per $m^3$ carrier liquid. If no viscosifying agent is added to an aqueous carrier liquid, amounts of 10–30 kg particulate material can be transported by the carrier liquid.

The high compressive strength of the consolidated mass of particulate material that can be obtained by applying the "EPIKOTE" 1001 can be illustrated by the following tests.

Sand grains of a size 20/40 US-mesh have been covered with a solid layer of "EPIKOTE" 1001. The amount of "EPIKOTE" was 5.5%w of the coated grains. The pore space of the mass of coated particles has thereafter been filled with a 1%w solution of triethanoldiamine in tap water, and the mass of particles was subsequently subjected to a temperature of 85° C. over a period of 96 hours. Cylindrical cores of consolidated sand were thus obtained having a diameter of 3.71 cm and a length of 3.72 cm. The unconfined compressive strength of two of these cores was found to be 232 and 240 $kg/cm^2$ (24.45 and 25.34 kN) respectively. Permeability reduction as a result of the consolidation was found to be about 24%.

A further test with an aqueous solution of 3%w triethanolamine instead of 1%w triethanolamine resulted in a consolidated mass having an unconfined compressive strength of 232 $kg/cm^2$ (24.54 kN).

The above tests were repeated twice with an aqueous solution of 0.1%w 2-(dimethylaminomethyl)phenol (trademark "DMP-10") and the result was that the consolidated mass thus obtained had an unconfined compressive strength of 189 $kg/cm^2$ (19.93 kN) and 204 $kg/cm^2$ (21.56 kN), respectively. The use of a 0.25%w aqueous solution of DMP resulted in an unconfined compressive strength of 148 $kg/km^2$ (15.60 kN).

It will be appreciated that the invention can be used for well treatments such as: placing and consolidating a mass of particulate material in a cavity communicating with a perforation in a casing; placing and consolidating masses of particulate material at other locations in or around a well penetrating a subsurface formation, such as for placing and consolidating a gravel pack or for placing and consolidating propping agents in a fracture; and the like.

What is claimed is:

1. A process for emplacing and consolidating a mass of particles within a selected subterranean location comprising:

coating the particles with a polymerizable polyepoxide which is substantially free of any hardener or curing agent and is solid at the surface temperature near the well but becomes soft at the temperature of the selected subterranean location and, at that temperature, is reactive to yield a substantially cured solid epoxy resin when contacted by an aqueous liquid containing a substantially homogeneously distributed effective amount of a polyamino compound which is a curing agent for curing epoxy resin-forming components;

suspending the coated particles in an aqueous liquid and pumping the suspension into the well so that a mass of the particles is deposited within the selected subterranean location; and contacting the particles in that mass with an aqueous liquid which contains a substantially homogeneously distributed effective amount of a polyamino compound which is a curing agent for epoxy resin-forming components, so that the softened coatings on the particles are converted to a substantially cured solid epoxy resin.

2. The process of claim 1 in which the curing agent is dissolved or dispersed in the aqueous liquid in which the polymer-coated particles are suspended.

3. The process of claim 1 in which an aqueous liquid which contains the curing agent is flowed into the mass of particles after that mass has been deposited within the selected subterranean zone.

4. The process of claim 1 in which the particles which are emplaced and consolidated are substantially well-rounded sand grains and the curing agent is a tertiary amine.

5. The process of claim 4 in which: the polyepoxide coating on the particles has a softening point of greater than 35° C., the proportion of the polyepoxide to the particles, in parts by weight, is from about 1 to 15 parts of polyepoxide per 100 parts of particles; and the concentration of curing agent in the aqueous liquid is from about 0.1 to 3.5% by weight.

6. The process of claim 1 in which: determinations are made of the temperatures likely to be encountered in or near the well to be treated at both a surface location and the selected subterranean zone; and the softening temperature of the polyepoxide with which the particles are coated is adjusted by mixing at least two polyepoxides having different softening temperatures to provide a mixture which is substantially solid and substantially non-tacky at the temperature of said surface location but is soft and readily reactive at the temperature of the selected subterranean zone.

* * * * *